(12) United States Patent
Yu (10) Patent No.: US 10,117,534 B2
(45) Date of Patent: Nov. 6, 2018

(54) TRAY WITH CUPHOLDERS AND HAND-HOLES

(71) Applicant: Tae Hyon Yu, Harbor City, CA (US)

(72) Inventor: Tae Hyon Yu, Harbor City, CA (US)

(*) Notice: Subject to any disclaimer, the term of this patent is extended or adjusted under 35 U.S.C. 154(b) by 0 days.

(21) Appl. No.: 15/625,252

(22) Filed: Jun. 16, 2017

(65) Prior Publication Data

US 2017/0360231 A1 Dec. 21, 2017

Related U.S. Application Data

(60) Provisional application No. 62/352,537, filed on Jun. 20, 2016, provisional application No. 62/385,923, filed on Sep. 9, 2016.

(51) Int. Cl.
| | | |
|---|---|---|
| *B65D 1/24* | (2006.01) | |
| *A47G 23/06* | (2006.01) | |
| *A47J 47/14* | (2006.01) | |
| *B65D 5/00* | (2006.01) | |
| *B65D 5/30* | (2006.01) | |
| *B65D 5/42* | (2006.01) | |
| *B65D 5/468* | (2006.01) | |
| *B65D 5/50* | (2006.01) | |

(52) U.S. Cl.
CPC .......... *A47G 23/0625* (2013.01); *A47J 47/14* (2013.01); *B65D 5/0015* (2013.01); *B65D 5/302* (2013.01); *B65D 5/4216* (2013.01); *B65D 5/4266* (2013.01); *B65D 5/4608* (2013.01); *B65D 5/5021* (2013.01)

(58) Field of Classification Search
USPC .................. 206/557, 511, 565, 567, 561, 560
See application file for complete search history.

(56) References Cited

U.S. PATENT DOCUMENTS

| | | | | |
|---|---|---|---|---|
| 1,867,738 A | * | 7/1932 | Fraser ....................... | B42F 7/10 206/449 |
| 2,794,585 A | * | 6/1957 | Wagner ................ | B65D 5/5021 206/217 |
| 2,894,672 A | * | 7/1959 | Bamburg ............. | B65D 5/0035 206/45.26 |
| 4,262,804 A | * | 4/1981 | Nelson, Jr. ........... | B65D 5/2014 206/561 |
| 4,364,475 A | * | 12/1982 | D'Elia ..................... | B42F 7/10 206/425 |

(Continued)

*Primary Examiner* — Jacob K Ackun
(74) *Attorney, Agent, or Firm* — John K. Park; Park Law Firm (57) ABSTRACT

A tray comprises a base board portion, first to sixth side wall portions, and a first cupholder portion. The side wall portion extends vertically from the base board portion. Each of the two fifth side wall portions is extended from a side edge of the second side wall portion, bent vertically, and disposed so as to overlap and fixed with a part of the first or third side wall portion, forming first and second corners. Likewise, the two sixth side wall portions are provided. The first cupholder portion is disposed at the first corner between the first and second side wall portions, and comprises a horizontal cut-out over the second side wall portion and the fifth side wall portion, which is pushed inwards forming a cupholding space. The horizontal cut-out of the first cupholder portion is disposed through a middle high portion of the first corner.

16 Claims, 9 Drawing Sheets

(56) References Cited

U.S. PATENT DOCUMENTS

| | | | | |
|---|---|---|---|---|
| 4,981,217 | A * | 1/1991 | Lim | A47G 23/06 |
| | | | | 206/561 |
| 6,199,697 | B1 * | 3/2001 | Dirx | B65D 5/5028 |
| | | | | 206/449 |
| 6,708,874 | B1 * | 3/2004 | Montgomery | B65D 5/22 |
| | | | | 206/815 |
| 7,025,199 | B1 * | 4/2006 | Lim | A47G 19/06 |
| | | | | 206/217 |
| 7,870,995 | B1 * | 1/2011 | Kaltman | B65D 5/2047 |
| | | | | 206/485 |
| 8,365,980 | B2 * | 2/2013 | Wettlaufer | B65D 25/20 |
| | | | | 206/561 |
| 2001/0017315 | A1 * | 8/2001 | Baroudi | B65D 5/443 |
| | | | | 229/148 |
| 2012/0273383 | A1 * | 11/2012 | Bahr | B65D 71/0007 |
| | | | | 206/561 |
| 2013/0062241 | A1 * | 3/2013 | Blay Orenga | B65D 9/12 |
| | | | | 206/509 |
| 2013/0118943 | A1 * | 5/2013 | Furey | B65D 1/34 |
| | | | | 206/427 |
| 2014/0326631 | A1 * | 11/2014 | Cotie | B31B 1/74 |
| | | | | 206/509 |

* cited by examiner

TRAY WITH CUPHOLDERS AND HAND-HOLES

RELATED APPLICATION

This application is a Non-provisional Application of Provisional Application Ser. Nos. 62/352,537 for "Container Box" filed on Jun. 20, 2016 and 62/385,923 for "Tray with Cupholders and Hand-holes" filed on Sep. 9, 2016.

BACKGROUND OF THE INVENTION

The present invention relates to a tray with cupholders and hand-holes.

Usually, containers are needed to carry food conveniently in many situations in modern society.

However, since carrying of food in containers may be related to various kinds of foods and environments, it is necessary to optimize or improve the containers.

Accordingly, a need for a tray has been present for a long time considering the expansive demands in the everyday life. This invention is directed to solve these problems and satisfy the long-felt need.

SUMMARY OF THE INVENTION

The present invention contrives to solve the disadvantages of the prior art.

An aspect of the invention provides a tray.

The tray comprises a base board portion, first to sixth side wall portions, and a first cupholder portion.

The base board portion has a rectangular shape and comprising a top surface, a bottom surface, and first to fourth edges.

The first side wall portion extends vertically from the first edge of the base board portion, a second side wall portion extends vertically from the second edge of the base board portion, a third side wall portion extends vertically from the third edge of the base board portion, and a fourth side wall portion extends vertically from the fourth edge of the base board portion.

Each of the two fifth side wall portions is extended from a side edge of the second side wall portion, bent vertically, and disposed so as to overlap and fixed with a part of the first or third side wall portion, forming first and second corners.

Each of the two sixth side wall portions is extended from a side edge of the fourth side wall portion, bent vertically, and disposed so as to overlap and fixed with a part of the first or third side wall portion, forming third and fourth corners.

The first cupholder portion is disposed at the first corner between the first and second side wall portions, and comprises a horizontal cut-out over a part of the second side wall portion and a part of the fifth side wall portion, which is pushed inwards forming a cupholding space.

The horizontal cut-out of the first cupholder portion is disposed through a middle high portion of the first corner and comprises: a first section extending from the fifth side wall portion; a second section extending from the second side wall portion; and a third section connecting the first and second sections.

The first to sixth side wall portions may have a same height.

The horizontal cut-out may have a width of about one third of a height of the second side wall portion.

A border between the first section and the third section of the horizontal cut-out may be at an edge side between the first and second side wall portions when the horizontal cut-out is retracted in the first and fifth side wall portions.

A folding line may be provided between the second and third sections, the second side wall portion and the third section, and the fifth side wall portion and the first section.

Alternatively, a border between the second section and the third section of the horizontal cut-out may be at an edge side between the first and second side wall portions when the horizontal cut-out is retracted in the first and fifth side wall portions.

The tray may further comprise first and second advertisement surfaces.

The first advertisement surface is disposed on an inner part of the first side wall portion, which is exposed when the first cupholder is deployed and hidden when the first cupholder is retracted.

The second advertisement surface is disposed on an outer part of the fifth side wall portion, which is exposed when the first cupholder is deployed and hidden when the first cupholder is retracted.

The inner surface of the first side wall portion may be fixed to the outer surface of the fifth side wall portion with glue.

The tray may further comprise two fixing plate portions, each of which being extended from a top edge of the first or third side wall portion and configured to be folded over the first or third side wall portion and the fifth and sixth side wall portions, fixing the first or third side wall portion with the fifth and sixth side wall portions.

Each of the two fixing plate portions may comprise two latching protrusions, each of which being sticks out sideways at a side edge of the fixing plate portion and configured to be inserted into a slit provided through the second and fourth side wall portion at the first corner or the fourth corner.

The tray may further comprises two stacking protrusions and two stacking slits.

Each of the two stacking protrusions is cut out from a lower edge of the fixing plate portion and disposed vertically.

Each of the two stacking slits is provided at a lower edge of the first or third side wall portion.

The stacking protrusion is configured to be inserted into the stacking slit of another tray stacked thereon, securing vertical stacking of trays.

The tray may further comprise two side hand-holes, each of which being provided through a corresponding one of two facing side wall portions.

The tray may further comprise two bottom hand-holes, each of which being provided through the base board portion, so as to be configured for a user to insert a thumb into one side handle-hole and other finger into a corresponding bottom hand-hole and hold the tray securely.

Each of the two side hand-holes and the two bottom hand-holes may be provided by a through-hole or a partial cut-out.

The tray may further comprise four folding lines, two for each of two facing side wall portions, each of which being provided from a corresponding lower corner to a corresponding top edge with about 45 degrees, so that the tray is folded flatly.

The advantages of the present invention are: (1) the tray according to the invention is made with minimum amount of material but still very strong; and (2) the tray according to the invention facilitates the usage a lot through many structural features.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

The U.S. Provisional Application Ser. Nos. 62/352,537 for "Container Box" filed on Jun. 20, 2016 and 62/385,923 for "Tray with Cupholders and Hand-holes" filed on Sep. 9, 2016 are incorporated by reference herein for any and all purposes.

Referring to the figures, the embodiments of the invention are described in detail.

FIGS. 1-6 show trays with cup-holders and hand-holes according to embodiments of the present invention. Actually, the trays shown in FIGS. 1-6 have hand-holes disposed at two facing side wall portions of the trays.

Figure 1:
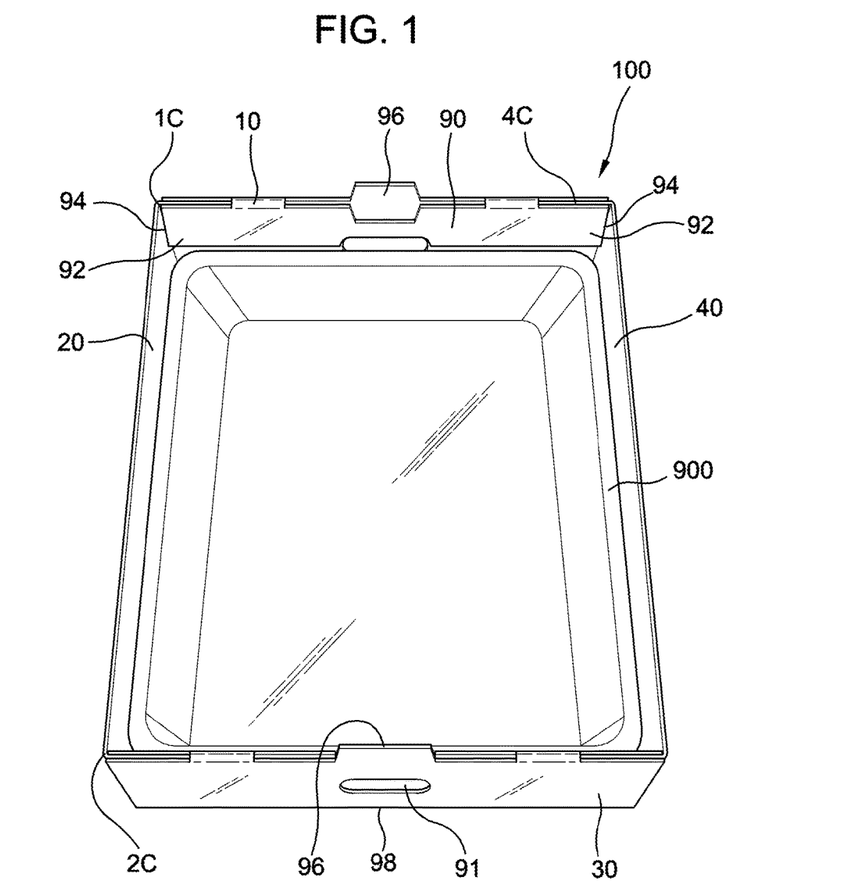
FIG. 1 is a picture showing a tray with an aluminum foil container in it according to an embodiment of the invention.
Figure 2:
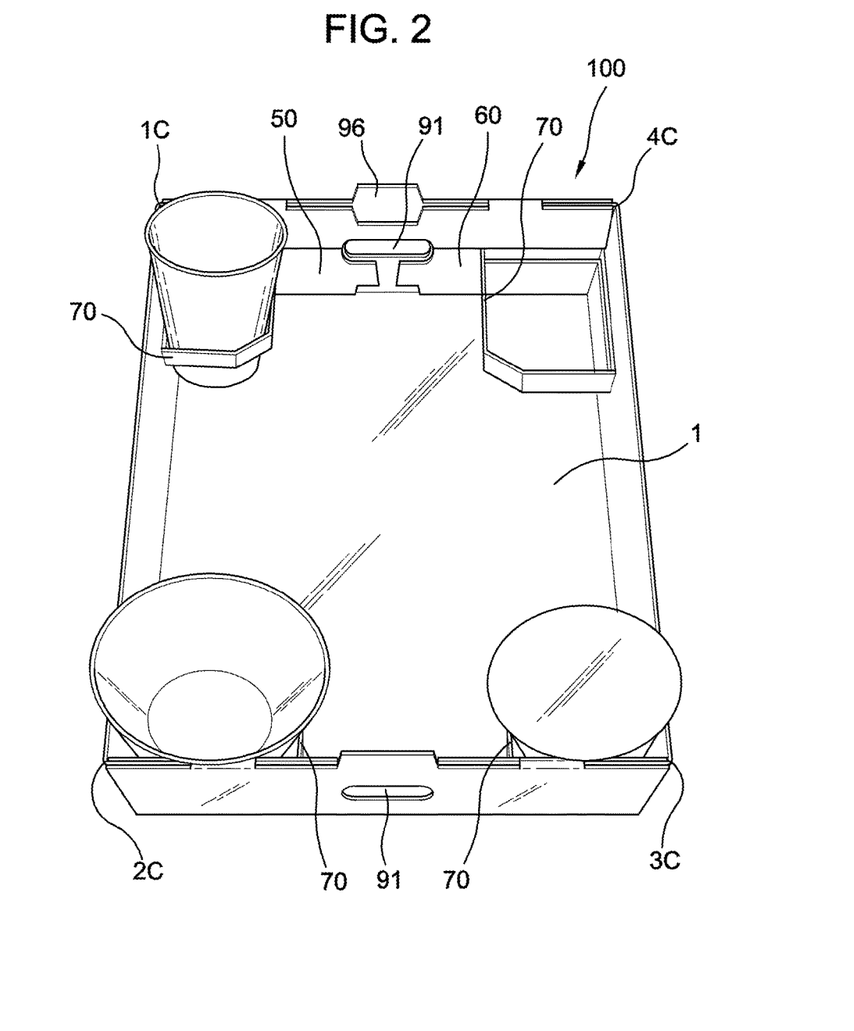
FIG. 2 is another picture showing a tray with three cups in it according to another embodiment of the invention.
Figure 3:
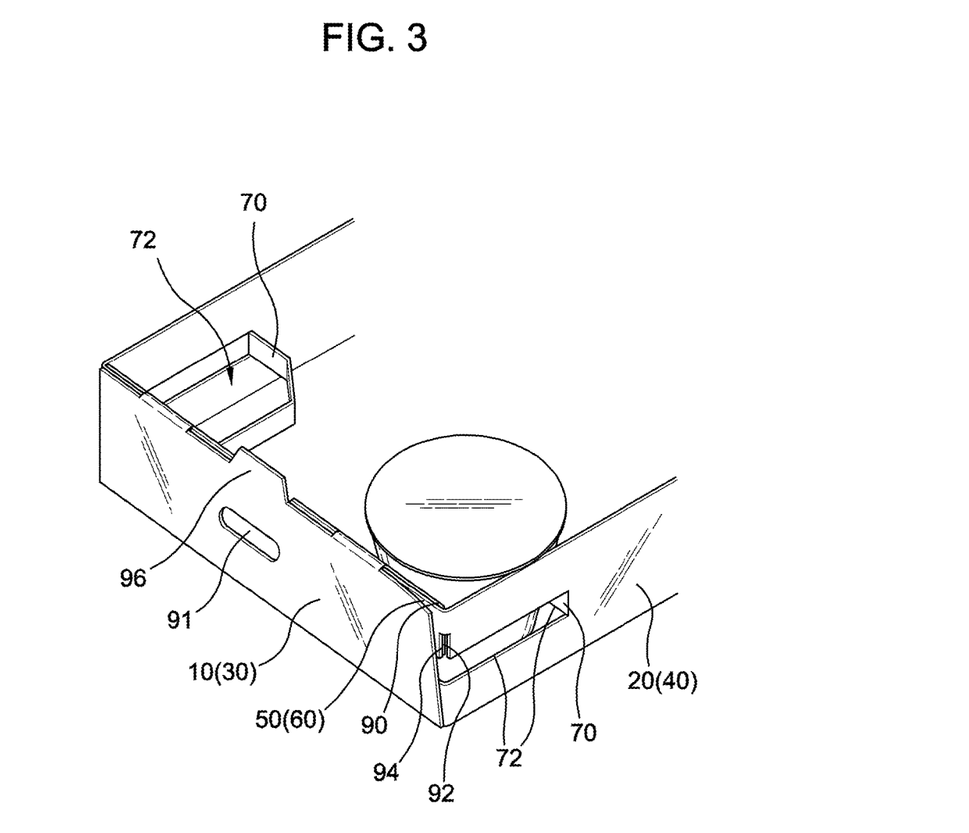
FIG. 3 is a picture showing a cup holder from outside according to an embodiment of the invention.

The tray combines the idea of tray and cup holder, and can be used conveniently in a restaurant or a catering business as shown in FIGS. 1, 2, and 3.

Since the tray according to the invention has portions for functions of tray and cup holders, the user does not have to purchase them separately as shown in FIG. 2. The central area of the tray can be used as a tray, while the cup holders are provided at the corners of the tray. Additionally, for the same reasons, the cost is saved in manufacturing and purchasing.

Figure 4:
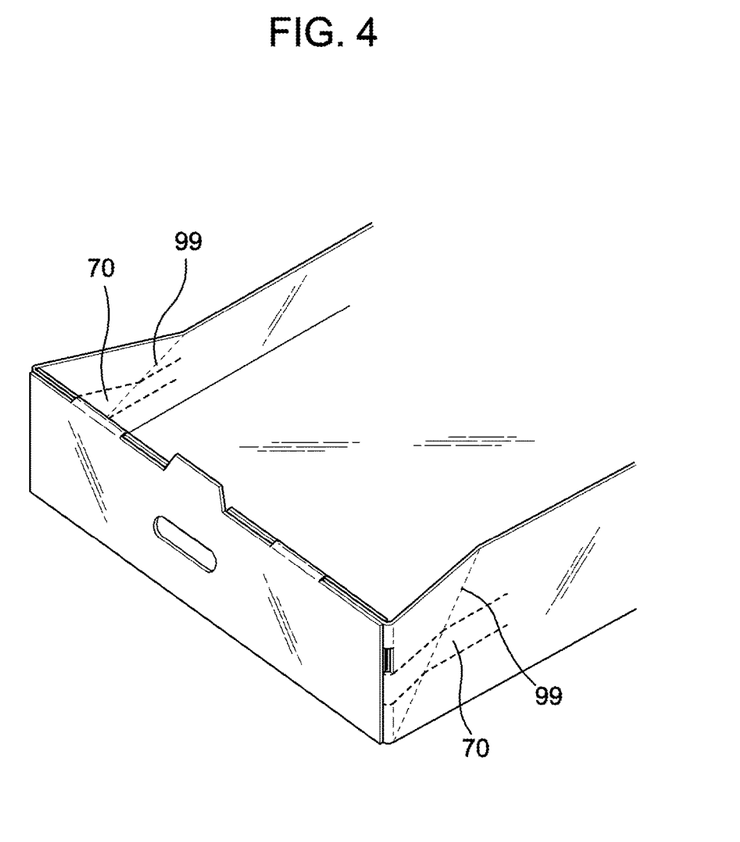
FIG. 4 is a picture showing a tray folded partially according to an embodiment of the invention.
Figure 8:
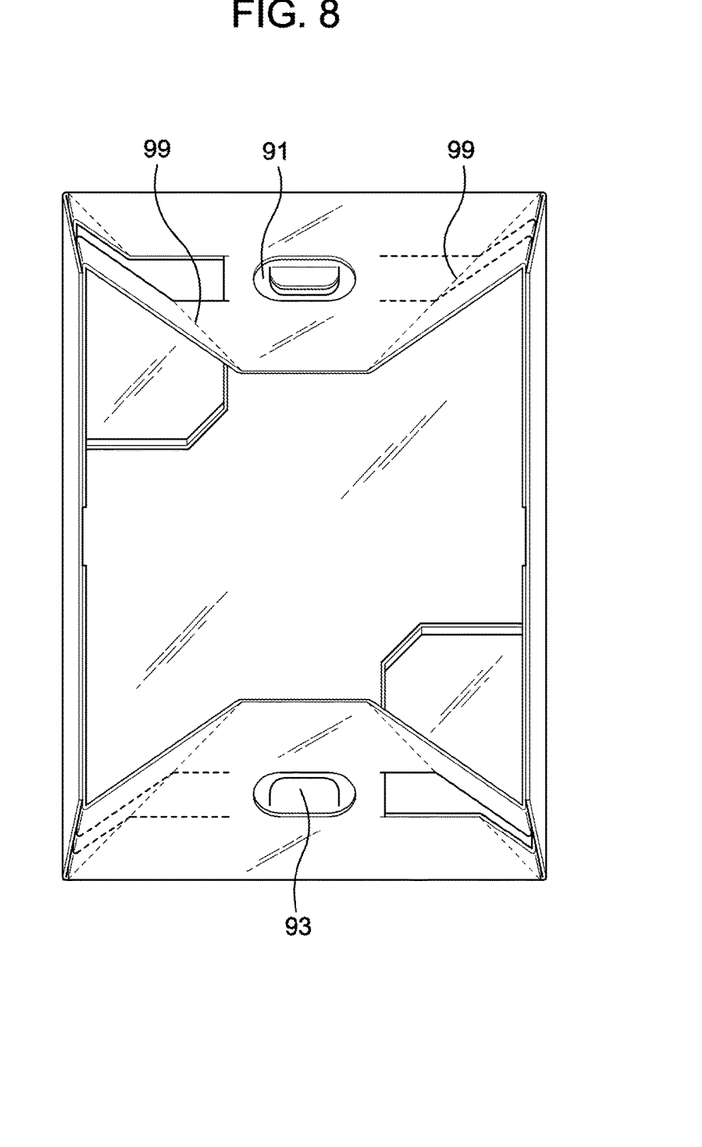
FIG. 8 is a picture showing another perspective view of the foldable tray with cupholders and hand-holes of FIG. 20, which is half folded.
Figure 9:
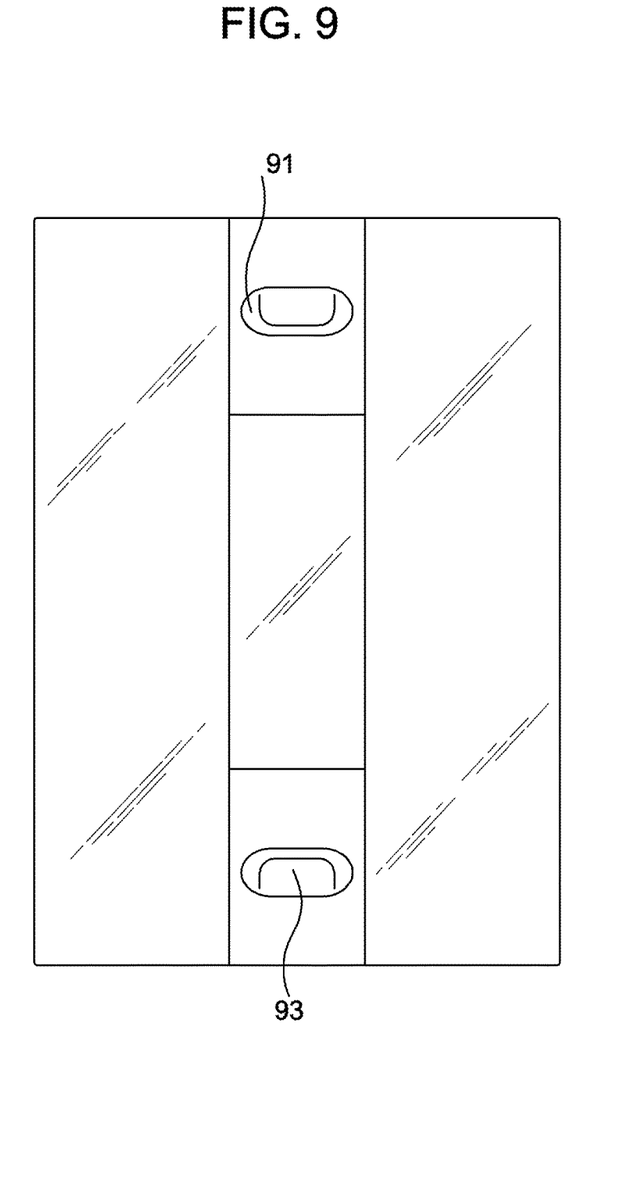
FIG. 9 is a picture showing another perspective view of the foldable tray with cupholders and hand-holes of FIG. 20, which is folded completely.

Also, since the tray can be folded, the storing space can be saved a lot in the restaurant as shown in FIGS. 4, 8, and 9. The trays can be stacked on top of each other. Because of that, the delivery of food can be made easy and efficient.

Since the cup holders are provided at four corners retractably, it takes no extra cost of material for manufacturing.

Tuck-in of the top is done at the sides enables saving of paper or cardboard.

Advertising script or image can be printed on surfaces of the tray.

Since the tray and the cup holders are provided in one solidly and monolithically, it is very stable in a car or on knees, for example, in a stadium.

The tray can includes a pair of hand holes through two opposing side walls.

Furthermore, the tray may further comprise one or two stacking protrusions (provided on a top edge portion of the side walls) and corresponding one or two stacking holes (provided on a bottom edge portion of the side walls). Using those corresponding stacking protrusions and holes, a plurality of trays assembled with four walls raised can be stacked vertically on top of each other.

In certain embodiment, the tray may further comprise a stiffening layer attached, for example using glue, to the side wall through which the hand holes are provided.

Of course, the tray may include only one, only two, or only three cup holders.

The tray may be made by cutting out from a piece of paper or cardboard and folding according to the invention.

Especially, the cup holder is made by partially cutting a band-shaped portion of the corner and pushing inwards. The dimension and shape can be varied according to the design choices.

Figure 5:
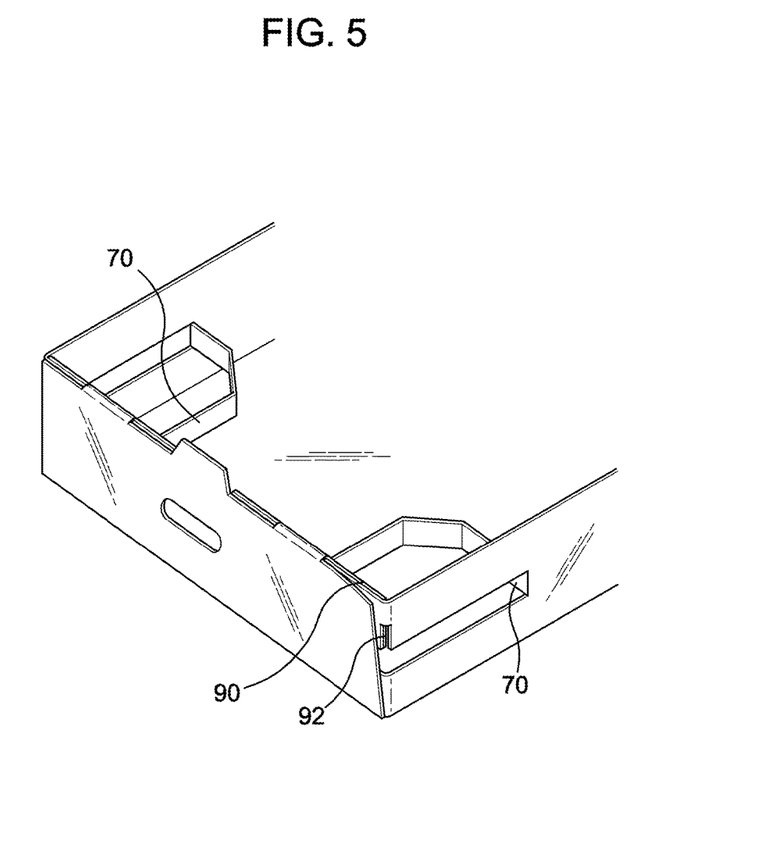
FIG. 5 is a picture showing a corner of a tray with a cup holder deployed as seen from outside according to an embodiment of the invention.

In certain embodiments of the invention, the tray may further comprise an enforcement strip provided along on the top edge portion of side walls, on the open portion only, as shown in FIG. 5. The enforcement strip may be folded wire.

The tray according to the invention may be used for burgers.

The tray can be made of plastic integrally, too. In such a case, only the retractable cup holders can be made of flexible material such as paper (then separately) or plastic (integrally).

Figure 6:
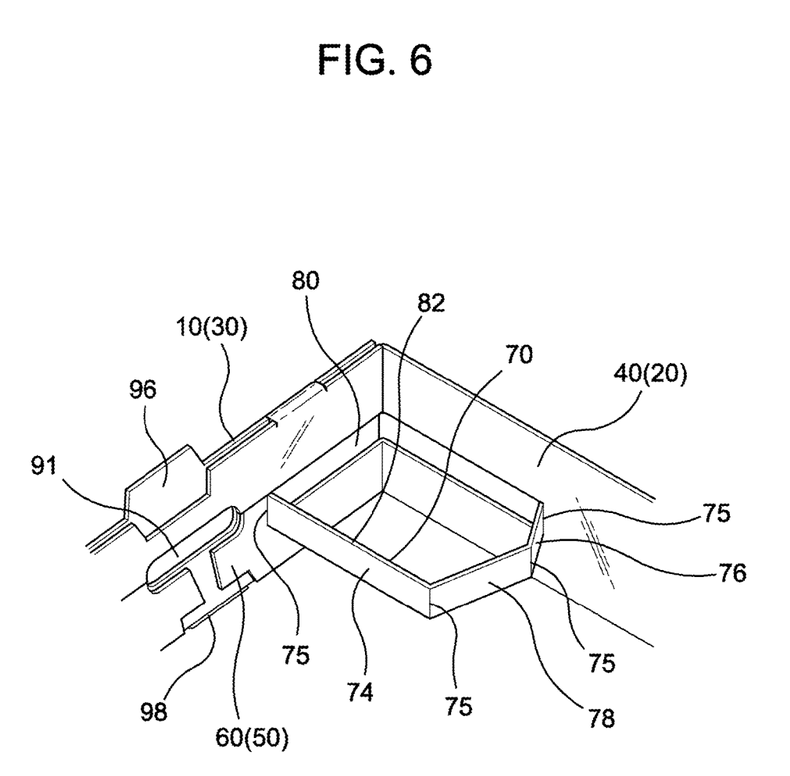
FIG. 6 is another picture showing a corner of a tray with a cup holder deployed as seen from inside according to an embodiment of the invention.
Figure 7:
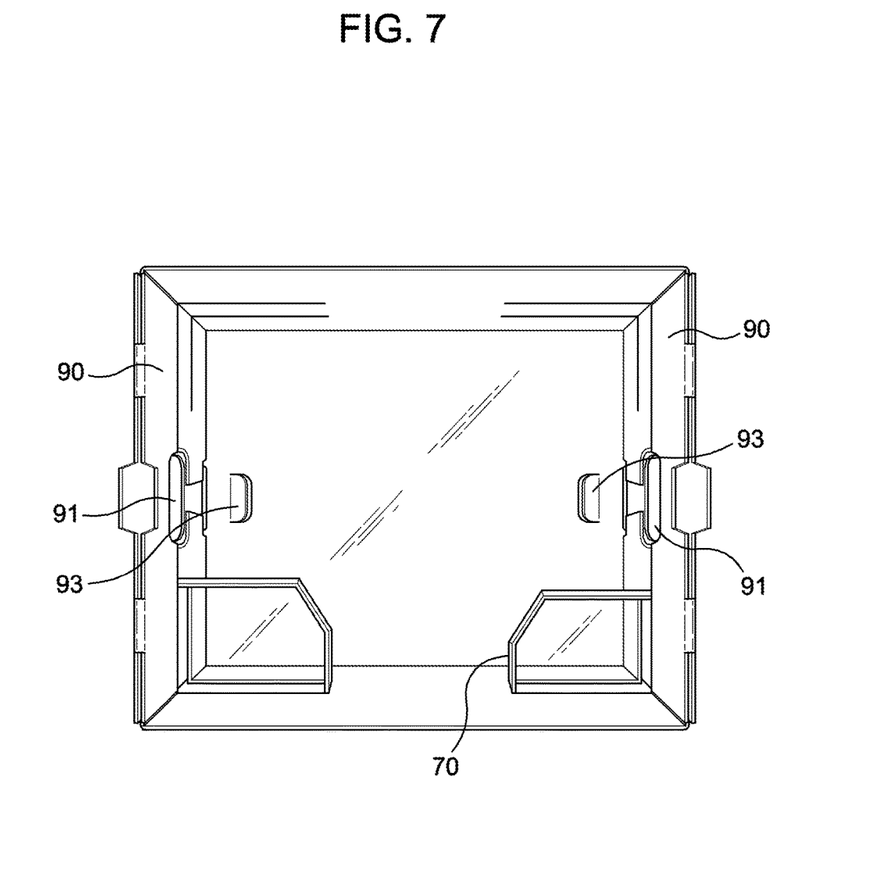
FIG. 7 is a picture showing a tray with cup-holders and hand-holes according to an embodiment of the invention.

Another aspect of the invention provides a tray with cupholders and hand-holes as shown in FIGS. 7-9. More specifically, the tray further comprises hand-holes disposed through the bottom of the tray, in addition to the side hand-holes shown in FIGS. 1-6.

The bottom hand-holes are provided with perforations provided partially around the hand-holes, so that initially the perforations are intact and the hand-holes are in closed states, and thus small food pieces can be prevented from falling through them. However, whenever it's needed, the perforations can be broken so that the hand-hole be in an open position, through which the user of the tray can insert his or her fingers while inserting one or more fingers through the side hand-holes, holding the tray much more stably.

As shown in FIGS. 1-9, the half-fixing portion is cut so as to extend halfway vertically, and it covers the upper half portion of the side wall, allowing the cup-holders can have a space through which it can be punched and installed inwards.

Otherwise, that is, if the fixing portion has a full length vertically, then the cupholders can not be deployed due to the fixing portion blocking the side wall completely from inside.

The bottom hand-holes along with the side hand-holes can provide a much more secure means to hold or carry the tray loaded with foods and drinks.

Also, the stacking protrusion is cutout from a portion of the half-cut fixing portion and therefore the cardboard or the material of the tray can be saved without any weakening the structure of the tray as shown in FIG. 1, for example.

An aspect of the invention provides a tray as shown in FIGS. 1-9.

The tray (100) comprises a base board portion (1), first to sixth side wall portions (10-60), and a first cupholder portion (70).

The base board portion (1) has a rectangular shape and comprising a top surface, a bottom surface, and first to fourth edges. The food stuffs of food container (900) may be put on the top surface as shown in FIG. 1.

The first side wall portion (10) extends vertically from the first edge of the base board portion (1), a second side wall portion (20) extends vertically from the second edge of the base board portion (1), a third side wall portion (30) extends vertically from the third edge of the base board portion (1), and a fourth side wall portion (40) extends vertically from the fourth edge of the base board portion (1), so as to make a box with an open top.

Each of the two fifth side wall portions (50) is extended from a side edge of the second side wall portion (20), bent vertically, and disposed so as to overlap and fixed with a part of the first or third side wall portion (10, 30), forming first and second corners (1C, 2C) as shown in FIG. 1.

Each of the two sixth side wall portions (60) is extended from a side edge of the fourth side wall portion (40), bent vertically, and disposed so as to overlap and fixed with a part of the first or third side wall portion (10), forming third and fourth corners (3C, 4C) as shown in FIGS. 1 and 2.

The first cupholder portion (70) is disposed at the first corner (1C) between the first and second side wall portions (10, 20), and comprises a horizontal cut-out (72) over a part of the second side wall portion (20) and a part of the fifth side wall portion (50), which is pushed inwards forming a cupholding space as shown in FIG. 3.

The horizontal cut-out (72) of the first cupholder portion (70) is disposed through a middle high portion of the first corner (1C) and comprises: a first section (74) extending from the fifth side wall portion (50); a second section (76) extending from the second side wall portion (20); and a third section (78) connecting the first and second sections (74, 76) as shown in FIG. 6. Of course, since the structure is symmetrical in all four corners and the first cupholder (70) can be in any of the four corners (1C, 2C, 3C, 4C), the side wall portions may be referred interchangeably, for example, 10(30), 40(20), 60(50), or 1C (3C) as in FIG. 6. In such a case, also FIG. 6 may be considered as a mirror image.

The first to sixth side wall portions (10-60) may have a same height. In some other embodiment, they may have different heights, of course.

The horizontal cut-out (72) may have a width of about one third of a height of the second side wall portion (20).

A border between the first section (74) and the third section (78) of the horizontal cut-out (72) may be at an edge side (1C) between the first and second side wall portions (10, 20) when the horizontal cut-out (72) is retracted in the first and fifth side wall portions (10, 50) as shown in FIG. 6.

A folding line (75) may be provided between the second and third sections (76, 78), the second side wall portion (20) and the second section (76), and the fifth side wall portion (50) and the first section (74) as shown in FIG. 6.

Alternatively, a border between the second section (76) and the third section (78) of the horizontal cut-out (72) may be at an edge side between the first and second side wall portions (10, 20) when the horizontal cut-out (72) is retracted in the first and fifth side wall portions (10, 50) as shown in FIGS. 4 and 8.

The tray (100) may further comprise first and second advertisement surfaces (80, 82).

The first advertisement surface (80) is disposed on an inner part of the first side wall portion (10), which is exposed when the first cupholder (70) is deployed and hidden when the first cupholder portion (70) is retracted.

The second advertisement surface (82) is disposed on an outer part of the fifth side wall portion (50), which is exposed when the first cupholder (70) is deployed and hidden when the first cupholder (70) is retracted. On the first and second advertisement surfaces (80, 82) can be printed advertising texts or patterns.

The inner surface of the first side wall portion (10) may be fixed to the outer surface of the fifth side wall portion (50) with glue as shown in FIGS. 8 and 9.

The tray (100) may further comprise two fixing plate portions (90), each of which being extended from a top edge of the first or third side wall portion (10, 30) and configured to be folded over the first or third side wall portion (10, 30) and the fifth and sixth side wall portions (50, 60), fixing the first or third side wall portion (10, 30) with the fifth and sixth side wall portions (50, 60) by wrapping them together at the top edge as shown in FIG. 1, for example.

Each of the two fixing plate portions (90) may comprise two latching protrusions (92), each of which being sticks out sideways at a side edge of the fixing plate portion (90) and configured to be inserted into a slit (94) provided through the second and fourth side wall portion (20, 40) at the first corner (1C) or the fourth corner (4C) as shown in FIGS. 1 and 3.

The tray (100) may further comprises two stacking protrusions (96) and two stacking slits (98).

Each of the two stacking protrusions (96) is cut out from a lower edge of the fixing plate portion (90) and disposed vertically.

Each of the two stacking slits (98) is provided at a lower edge of the first or third side wall portion (10, 30).

The stacking protrusion (96) is configured to be inserted into the stacking slit (98) of another tray (not shown) stacked thereon, securing vertical stacking of trays (100).

The tray (100) may further comprise two side hand-holes (91), each of which being provided through a corresponding one of two facing side wall portions (10-40) as shown in FIG. 7.

The tray (100) may further comprise two bottom hand-holes (93), each of which being provided through the base board portion (1), so as to be configured for a user to insert a thumb into one side handle-hole (91) and other finger into a corresponding bottom hand-hole (93) and hold the tray (100) securely as shown in FIG. 7.

Each of the two side hand-holes (91) and the two bottom hand-holes (93) may be provided by a through-hole or a partial cut-out as shown in FIG. 7.

The tray (100) may further comprise four folding lines (99), two for each of two facing side wall portions (10 and 30 or 20 and 40), each of which being provided from a corresponding lower corner to a corresponding top edge with about 45 degrees, so that the tray (100) is folded flatly as shown in FIGS. 4 and 8.

In certain embodiments of the invention, the tray (100) may further comprise a second, third, or fourth cupholder portion (70) at the second, third, or fourth corner (2C, 3C, 4C) as shown in FIG. 2. Cups and noodle soup cups can be held there securely.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A tray comprising:
a base board portion having a rectangular shape and comprising a top surface, a bottom surface, and first to fourth edges;
a first side wall portion extending vertically from the first edge of the base board portion;
a second side wall portion extending vertically from the second edge of the base board portion;
a third side wall portion extending vertically from the third edge of the base board portion;
a fourth side wall portion extending vertically from the fourth edge of the base board portion;
two fifth side wall portions, each of which being extended from a side edge of the second side wall portion, bent vertically, and disposed so as to overlap and fixed with a part of the first and third side wall portions, forming first and second corners;
two sixth side wall portions, each of which being extended from a side edge of the fourth side wall portion, bent vertically, and disposed so as to overlap and fixed with a part of the first and third side wall portions, forming third and fourth corners;
a first cupholder portion disposed at the first corner between the first and second side wall portions, and comprising a horizontal cut-out over a part of the second side wall portion and a part of the fifth side wall portion, which is pushed inwards forming a cupholding space, wherein the horizontal cut-out is cut from middle portions of the part of the second side wall portion and the part of the fifth side wall portion, leaving horizontal edge portions of the part of the second side wall portion and the part of the fifth side wall portion above and below a cut-out gap portion left behind by the horizontal cut-out,
wherein the horizontal cut-out of the first cupholder portion is disposed through a middle high portion of the first corner and comprises:
a first section extending from the fifth side wall portion;
a second section extending from the second side wall portion; and
a third section connecting the first and second sections.

2. The tray of claim 1, wherein the first to sixth side wall portions have a same height.

3. The tray of claim 2, wherein the horizontal cut-out has a width of about one third of a height of the second side wall portion.

4. The tray of claim 1, wherein a border between the first section and the third section of the horizontal cut-out is at an edge side between the first and second side wall portions when the horizontal cut-out is retracted in the first and fifth side wall portions.

5. The tray of claim 4, wherein a folding line is provided between the second and third sections, the second side wall portion and the second section, and the fifth side wall portion and the first section.

6. The tray of claim 1, wherein a border between the second section and the third section of the horizontal cut-out is at an edge side between the first and second side wall portions when the horizontal cut-out is retracted in the first and fifth side wall portions.

7. The tray of claim 1, further comprising:
a first advertisement surface on an inner part of the first side wall portion, which is exposed when the first cupholder is deployed and hidden when the first cupholder is retracted; or
a second advertisement surface on an outer part of the fifth side wall portion, which is exposed when the first cupholder is deployed and hidden when the first cupholder is retracted.

8. The tray of claim 1, wherein the inner surface of the first side wall portion is fixed to the outer surface of the fifth side wall portion with glue.

9. The tray of claim 1, further comprising two fixing plate portions, each of which being extended from a top edge of the first and third side wall portions and configured to be folded over the first or third side wall portion and the fifth and sixth side wall portions, fixing the first and third side wall portions with the fifth and sixth side wall portions.

10. A tray comprising:
a base board portion having a rectangular shape and comprising a top surface, a bottom surface, and first to fourth edges;
a first side wall portion extending vertically from the first edge of the base board portion;
a second side wall portion extending vertically from the second edge of the base board portion;
a third side wall portion extending vertically from the third edge of the base board portion;
a fourth side wall portion extending vertically from the fourth edge of the base board portion;
two fifth side wall portions, each of which being extended from a side edge of the second side wall portion, bent vertically, and disposed so as to overlap and fixed with a part of the first and third side wall portions, forming first and second corners;
two sixth side wall portions, each of which being extended from a side edge of the fourth side wall portion, bent vertically, and disposed so as to overlap and fixed with a part of the first and third side wall portions, forming third and fourth corners;
a first cupholder portion disposed at the first corner between the first and second side wall portions, and comprising a horizontal cut-out over a part of the second side wall portion and a part of the fifth side wall portion, which is pushed inwards forming a cupholding space,
wherein the horizontal cut-out of the first cupholder Portion is disposed through a middle high portion of the first corner and comprises:
a first section extending from the fifth side wall portion;
a second section extending from the second side wall portion; and
a third section connecting the first and second sections,
further comprising two fixing plate portions, each of which being extended from a top edge of the first and third side wall portion and configured to be folded over the first or third side wall portion and the fifth and sixth side wall portions, fixing the first and third side wall portions with the fifth and sixth side wall portions,
wherein each of the two fixing plate portions comprises two latching protrusions, each of which being sticks out sideways at a side edge of the fixing plate portion and configured to be inserted into a slit provided through the second and fourth side wall portion at the first corner and the fourth corners.

11. The tray of claim 10, further comprising:
two stacking protrusions, each of which being cut out from a lower edge of the fixing plate portion and disposed vertically;
two stacking slits, each of which being provided at a lower edge of the first and third side wall portions, wherein the stacking protrusion is configured to be inserted into the stacking slit of another tray stacked thereon, securing vertical stacking of trays.

12. The tray of claim 1, further comprising two side hand-holes, each of which being provided through a corresponding one of two facing side wall portions.

13. The tray of claim 12, further comprising two bottom hand-holes, each of which being provided through the base board portion, so as to be configured for a user to insert a thumb into one side handle-hole and other finger into a corresponding bottom hand-hole and hold the tray securely.

14. The tray of claim 13, wherein each of the two side hand-holes and the two bottom hand-holes is provided by a through-hole or a partial cut-out.

15. The tray of claim 1, further comprising four folding lines, two for each of two facing side wall portions, each of which being provided from a corresponding lower corner to a corresponding top edge with about 45 degrees, so that the tray is folded flatly.

16. The tray of claim 1, further comprising second, third, or fourth cupholder portion at the second, third, or fourth corner.

\* \* \* \* \*